(12) United States Patent
Hallenstål et al.

(10) Patent No.: US 10,749,911 B2
(45) Date of Patent: *Aug. 18, 2020

(54) SERVICE CONTROL AWARENESS FOR CALL ROUTING BETWEEN PACKET SWITCHED TELEPHONY DOMAIN AND CIRCUIT SWITCHED TELEPHONY DOMAIN

(71) Applicant: Telefonaktiebolaget LM Ericsson (publ), Stockholm (SE)

(72) Inventors: Magnus Hallenstål, Täby (SE); Jan Holm, Stora Skedvi (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 183 days.

This patent is subject to a terminal disclaimer.

(21) Appl. No.: 15/941,049

(22) Filed: Mar. 30, 2018

(65) Prior Publication Data

US 2018/0227330 A1     Aug. 9, 2018

Related U.S. Application Data

(63) Continuation of application No. 14/763,909, filed as application No. PCT/EP2013/051826 on Jan. 30, 2013, now Pat. No. 10,044,768.

(51) Int. Cl.
    *H04L 29/06*     (2006.01)
    *H04M 7/00*     (2006.01)

(52) U.S. Cl.
    CPC ........ *H04L 65/1033* (2013.01); *H04L 65/104* (2013.01); *H04L 65/1006* (2013.01);
    (Continued)

(58) Field of Classification Search
None
See application file for complete search history.

(56) References Cited

U.S. PATENT DOCUMENTS 7,916,685 B2    3/2011    Schaedler et al.
2002/0168060 A1    11/2002    Huie
(Continued)

FOREIGN PATENT DOCUMENTS

WO     WO 02/21857 A1     3/2012

OTHER PUBLICATIONS

3GPP TS 23.292 V11.1.0; Dec. 2011; $3^{rd}$ Generation Partnership Project, Technical Specification Group Services and System Aspects; IP Multimedia Subsystem (IMS) Centralized Services; Stage 2 (Release 11), 117 pages.
(Continued)

*Primary Examiner* — Rebecca E Song
(74) *Attorney, Agent, or Firm* — Sage Patent Group

(57) ABSTRACT

A telecommunications network has a packet switched domain for handling packet based calls and a circuit switched telephony domain for handling circuit switched calls. A node of the packet switched telephony domain decides whether to terminate a call to a user equipment using a packet based connection to the user equipment or using a circuit switched connection to the user equipment. In response to deciding to terminate the call using the circuit switched connection, the node sends, to a further node controlling routing of calls between the packet switched telephony domain and the circuit switched telephony domain, an indication that services related to the call are controlled in the packet switched telephony domain. In accordance with the indication, the further node may then adapt its control signalling with respect to a node of the circuit switched telephony domain.

26 Claims, 9 Drawing Sheets

(52) U.S. Cl.
CPC ...... *H04L 65/1016* (2013.01); *H04L 65/1069* (2013.01); *H04L 65/1096* (2013.01); *H04M 7/006* (2013.01)

(56) References Cited

U.S. PATENT DOCUMENTS

| | | |
|---|---|---|
| 2008/0316998 A1 | 12/2008 | Procopio et al. |
| 2009/0003276 A1* | 1/2009 | Mutikainen ........... H04W 48/18 370/329 |
| 2009/0257418 A1* | 10/2009 | Allen ..................... H04W 8/24 370/338 |
| 2011/0296034 A1* | 12/2011 | Mayer ................. H04L 65/1006 709/227 |
| 2012/0044861 A1 | 2/2012 | Lu et al. |

OTHER PUBLICATIONS

International Search Report and Written Opinion of the International Searching Authority, PCT/EP2013/051826, dated Oct. 4, 2013, 13 pages.

International Preliminary Report on Patentability, PCT/EP2013/051826, dated Jan. 26, 2015, 17 pages.

3GPP, Technical Specification, "3$^{rd}$ Generation Partnership Project; Technical Specification Group Services and System Aspects; IP Multimedia Subsystem (IMS) centralized services; Stage 2" (Release 12) 3GPP TS 23.292 V12.0.0 (Dec. 2012), 119 pages.

Noldus, et al., "Multi-access for the IMS Network," *Ericsson Review*, No. 2, May 7, 2008, 6 pages.

* cited by examiner

SERVICE CONTROL AWARENESS FOR CALL ROUTING BETWEEN PACKET SWITCHED TELEPHONY DOMAIN AND CIRCUIT SWITCHED TELEPHONY DOMAIN

CROSS REFERENCE TO RELATED APPLICATIONS

This application is a continuation of U.S. application Ser. No. 14/763,909, filed on Jul. 28, 2015, which is a 35 U.S.C. § 371 national stage application of PCT International Application No. PCT/EP2013/051826, filed on 30 Jan. 2013. The disclosures and contents of both of the above referenced applications are incorporated by reference herein in their entireties. The above-referenced PCT International Application was published in the English language as International Publication No. WO 2014/117835 A1 on Aug. 7, 2014.

TECHNICAL FIELD

The present invention relates to methods for handling calls in a telecommunications network having a packet switched (PS) telephony domain and a circuit switched (CS) telephony domain, and to corresponding devices.

BACKGROUND

In telecommunications networks, a well established way of handling calls is to use a CS connection between the telecommunications network and a user equipment (UE) for terminating a call. Further, there is the possibility of using a PS connection between the telecommunications network and a UE for terminating a call. For supporting the termination via the CS connection and handling CS calls, the telecommunications network is typically equipped with corresponding CS infrastructure, e.g., a switching node. Similarly, PS infrastructure may be provided for supporting the termination via the PS connection and handling packet based calls using Internet Protocol (IP) packets for transmitting media components and control signaling of a call. The PS infrastructure may for example be implemented by a packet telephony system (PTS) including one or more application servers. Some telecommunications networks may also provide both a CS telephony domain for handling CS calls and a PS telephony domain for handling PS calls.

An example of access technology which may be used for establishing a PS connection to a UE is the LTE (Long Term Evolution) radio access technology specified by the $3^{rd}$ Generation Partnership Project (3GPP). Since this radio access technology does not support CS connections to the UE, a PTS may be used to provide telephony services using PS technology. In particular, a technologies referred to as IMS (IP Multimedia Subsystem) and VoLTE (Voice over LTE) may be used for implementing the PTS. In some cases, the IMS may also provide services to UEs which are connected using $2^{nd}$ Generation (2G) radio access technology, e.g., GSM (Global System for Mobile Communications) radio access technology in connection with General Packet Radio Service (GPRS), or $3^{rd}$ Generation (3G) radio access technology, e.g., UMTS (Universal Mobile Telecommunication System) radio access technology.

For unifying service experience, a concept referred to as IMS Centralized Services (ICS) was introduced. Details of the ICS concept can for example be found in 3GPP Technical Specification (TS) 23.292 V12.0 (2012-12). In this case telephony services for a UE are controlled by IMS in the same way as for VoLTE, even if the UE is connected via a 2G/3G access and attached to a switching node of the CS telephony domain referred to as Mobile Switching Center (MSC).

In one implementation of the ICS concept as specified in 3GPP TS 23.292, the UE is not specifically enhanced for ICS and attached to an MSC which is not specifically enhanced for ICS. In this case, all calls to or from the UE will be routed through the IMS, using the CS connection via the MSC to the UE. In such cases, the UE and the MSC will operate in the same way as for conventional CS calls which are routed through the CS telephony domain.

However, in such implementation problems may arise due to simultaneous execution of certain services both by the IMS and by the MSC. For example, a service referred to as Conditional Forwarding No Reply (CFNR) may be executed both by the IMS and by the MSC. A corresponding scenario is illustrated in FIG. 1, which involves IMS 11, MSC 12, and UE 13.

The scenario of FIG. 1 assumes that an incoming call from user A is directed to user B which is attached to MSC 12 and uses ICS implemented by IMS 11. User B is further assumed to have configured a CFNR service which forwards the calls to user C, making use of UE 13 if the call is not answered. This CFNR configuration is applied by IMS 11 and also by MSC 12.

As can be seen, due to the ICS implementation, the incoming call from user A first arrives at IMS 11, as indicated by Session Initiation Protocol (SIP) Invite message 21. IMS 11 then determines that user B is attached via a CS connection to MSC 12 and routes the call to MSC 12. This is accomplished by sending Integrated Services Digital Network User Part (ISUP) Initial Address Message (IAM) 22 toward MSC 12.

Upon receiving message 22, MSC 12 handles the call in the same way as a conventional CS call. This also involves starting a timer and, if the call is not answered by user B before the timer expires, forwarding the call to user C, i.e., to UE 13. As indicated by steps 23 and 24, the illustrated scenario assumes that the call is not answered by user B and is forwarded by MSC 12 to user C. For this purpose, MSC 12 proceeds by setting up a CS connection with UE 13, by sending a call setup command 25 toward the UE 13. As indicated by step 26, the call may then be answered at UE 13.

Due to the ICS configuration, the CFNR service is executed also at IMS 11. That is to say, also IMS 11 starts a timer and, if the call is not answered by user B before the timer expires, forwards the call to user C, i.e., to UE 13, as indicated by steps 27 and 28. The forwarding is in this case accomplished by first sending ISUP Release message (REL) 29 to MSC 12 to indicate that the termination toward user B should be released. Upon receiving ISUP REL 29, MSC 12 also clears the connection to user C, by sending a call release command 30 toward UE 13. User C will therefore not be able to receive the call, but rather encounter "ghost ringing" with no one on the other end, as indicated by step 31.

The call forwarding by IMS 11 also involves sending a call setup command 32 toward UE 13, to setup the call as forwarded to user C. However, since UE 13 is busy due to the ghost ringing, it returns busy indication 33 to the IMS 11. As indicated by step 34, IMS 11 will therefore conclude that the call cannot be setup due to UE 13 being busy. It is to be understood that also the call forwarding by the IMS 11 may involve interaction via the MSC 12. However, for the sake of clarity such interaction with the MSC 12 is not explicitly illustrated in FIG. 1.

Accordingly, due to the concurrent control of the CFNR service by the IMS 11 and the MSC 12, user A may encounter the line being busy, and user C may experience ghost ringing, which is an undesirable behavior.

Accordingly, there is a need for techniques which allow for efficiently handling calls in a telecommunications network having a CS telephony domain and a PS telephony domain.

SUMMARY

According to an embodiment of the invention, a method of call handling in a telecommunications network is provided. The telecommunications network has a PS telephony domain for handling packet based calls and a CS telephony domain for handling CS calls. According to the method, a node of the PS telephony domain decides whether to terminate a call to a UE using a PS connection to the UE or using a CS connection to the UE. In response to deciding to terminate the call using the CS connection, the node sends, to a further node controlling routing of calls between the PS telephony domain and the CS telephony domain, an indication that services related to the call are controlled in the PS telephony domain.

According to an embodiment of the invention, a method of call handling in a telecommunications network is provided. The telecommunications network has a PS telephony domain for handling packet based calls and a CS telephony domain for handling CS calls. According to the method, a node controls routing of a call from the PS telephony domain to the CS telephony domain. This is accomplished in response to a decision in the PS telephony domain to terminate the call in the CS telephony domain. Further, the node receives an indication that services related to the call are controlled in the PS telephony domain. In accordance with the received indication, the node adapts its control signalling to at least one node of the CS telephony domain.

According to a further embodiment of the invention, a node for a PS telephony domain of a telecommunications network is provided. The PS telephony domain is for handling packet based calls. The telecommunications network further has a CS telephony domain for handling CS calls. The node comprises at least one interface and at least one processor. The at least one processor is configured to:

decide whether to terminate a call to a UE using a PS connection to the UE or using a CS connection to the UE, and in response to deciding to terminate the call using the CS connection, send via the at least one interface an indication that services related to the call are controlled in the PS telephony domain to a further node which controls routing of calls between the PS telephony domain and the CS telephony domain.

According to a further embodiment of the invention, a node for a telecommunications network having a PS telephony domain for handling packet based calls and a CS telephony domain for handling CS calls is provided. The node comprises a first interface to at least one node of the PS telephony domain, a second interface to at least one node of the CS telephony domain, and at least one processor. The at least one processor is configured to:

in response to a decision in the PS telephony domain to terminate a call to a UE using a CS connection to the UE, control routing of the call from the PS telephony domain to the CS telephony domain, receive, via the first interface, an indication that services related to the call are controlled in the PS telephony domain, and adapt control signalling via the second interface in accordance with the received indication.

According to a further embodiment of the invention, a computer program product comprising program code to be executed by at least one processor of a node for a PS telephony domain of a telecommunications network is provided. The PS telephony domain is for handling packet based calls. The telecommunications network further has a CS telephony domain for handling CS calls. Execution of the program code causes the node to:

decide whether to terminate a call to a UE using a PS connection to the UE or using a CS connection to the UE, and in response to deciding to terminate the call using the CS connection, send an indication that services related to the call are controlled in the PS telephony domain to a further node which controls routing of calls between the PS telephony domain and the CS telephony domain.

According to a further embodiment of the invention, a computer program product comprising program code to be executed by at least one processor of a node for a telecommunications network having a PS telephony domain for handling packet based calls and a CS telephony domain for handling CS calls is provided. Execution of the program code causes the node to:

in response to a decision in the PS telephony domain to terminate a call to a UE using a CS connection to the UE, control routing of the call from the PS telephony domain to the CS telephony domain, receive an indication that services related to the call are controlled in the PS telephony domain, and adapt control signalling to at least one node of the CS telephony domain in accordance with the received indication.

DETAILED DESCRIPTION OF EMBODIMENTS

In the following, concepts in accordance with exemplary embodiments of the invention will be explained in more detail and with reference to the accompanying drawings. The illustrated embodiments relate to concepts for handling calls in a telecommunications network having a PS telephony domain for handling packet based calls, and a CS telephony domain for handling CS calls. In the illustrated examples, it is assumed that the telecommunications network is a 3GPP or a 3GPP2 mobile telecommunications network, and that the PS telephony domain is implemented using IMS infrastructure, while the CS telephony domain is implemented using 2G/3G infrastructure. In particular, the IMS may provide a PTS which is configured to handle calls using IP packets for transmitting media components and control signalling of a call. In this telecommunications network, a PS connection to a UE may for example be established using LTE radio access technology and a CS connection to a UE may for example be established using GSM or UMTS radio access technology. However, it is to be understood that the illustrated concepts are not limited to the above exemplary type of telecommunications network and access technology and could also be applied in other types of telecommunications network, e.g., using other infrastructure for implementing the PS telephony domain or CS telephony domain and/or using other types of access technology, including non-3GPP access technologies such as fixed broadband access, Wireless Local Area Network (WLAN), or WiMax.

Figure 1:
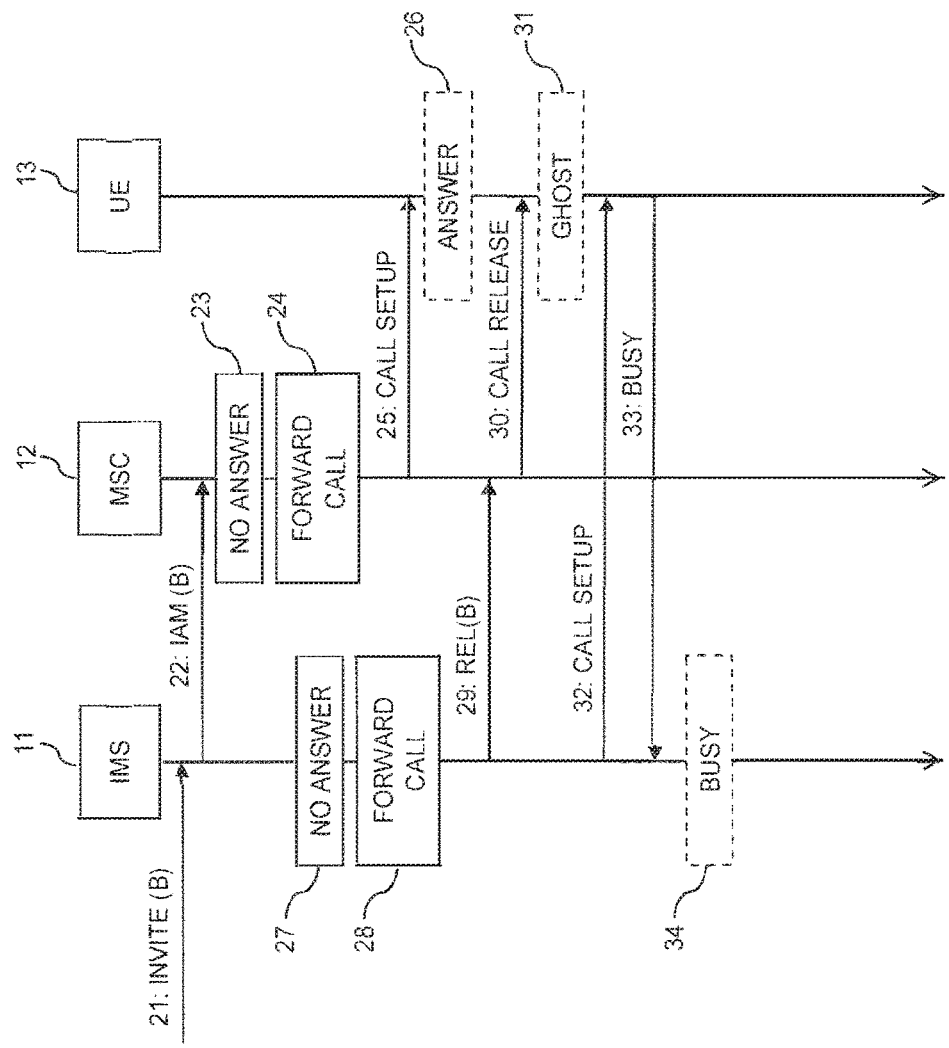
FIG. 1 shows a signalling diagram for illustrating exemplary procedures in a telecommunications network with concurrent control of a service in a PS telephony domain and in the CS telephony domain.
Figure 2:
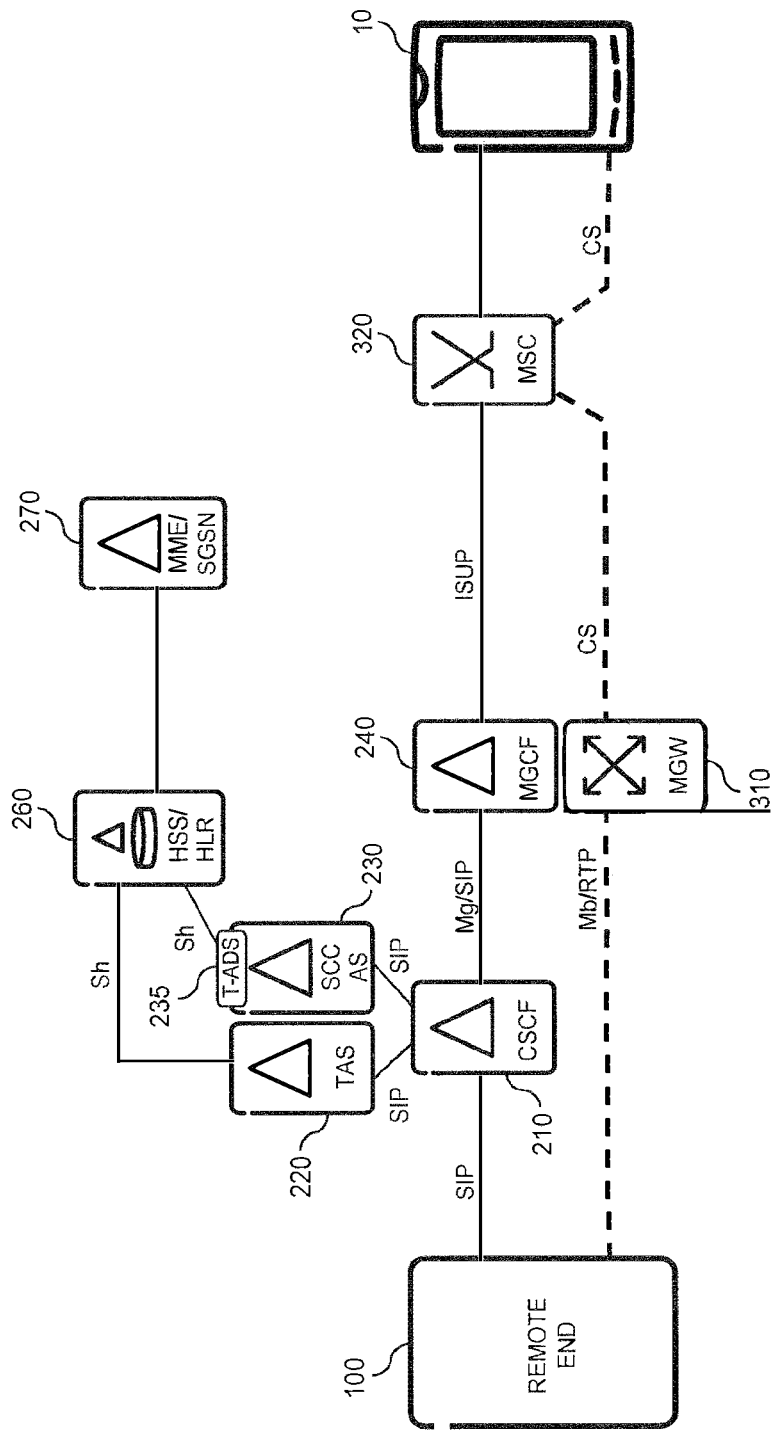
FIG. 2 shows exemplary infrastructure of a telecommunications network in which concepts according to an embodiment of the invention may be applied.

Still further, the telecommunications network is assumed to support centralized control of services in the PS telephony domain. In particular, telephony services may be controlled in the PTS provided by the IMS, irrespective of calls being terminated or originated in CS or PS. For this purpose, an ICS implementation in accordance with 3GPP TS 23.292 may be applied. The underlying ICS implementation is illustrated in FIG. 2.

As illustrated, a UE 10 may be attached to the telecommunications network by a CS connection to an MSC 320. In accordance with the ICS implementation, a call from a remote end 100 is routed through the CS telephony domain of the telecommunications network, using the IMS infrastructure. The IMS infrastructure specifically includes a Call Session Control Function (CSCF) 210, which acts as a central control node for IMS services. The CSCF 210 may actually act in different roles, e.g., as an Interrogating CSCF (I-CSCF), as a Serving CSCF (S-CSCF), or as a Proxy CSCF (P-CSCF). However, the difference between such roles will not be further addressed herein.

Further, the IMS infrastructure includes a Telephony Application Server (TAS) 220 for providing telephony services, which may also include Multimedia Telephony services. In the latter case, the TAS 220 may also be referred to as Multimedia Telephony Application Server (MTAS). Still further, the IMS infrastructure includes a Service Centralization and Continuity Application Server (SCC AS) 230 which typically implements session continuity mechanisms and mechanisms for centralization of the telephony services. In the illustrated scenario, the SCC AS 230 is assumed to be also responsible for selecting the access type for terminating calls, i.e., whether a call is terminated using a PS connection to a UE or using a CS connection to a UE. This may be implemented by a Terminating Access Domain Selection (T-ADS) subsystem 235 of the SCC AS 230.

Further, the IMS infrastructure includes a Media Gateway Control Function (MGCF) 240, which is responsible of controlling routing of calls between the PS telephony domain and the CS telephony domain, in particular between the PTS and the CS telephony domain. For this purpose, the MGCF 240 on the one hand interacts with one or more nodes of the PS telephony domain, using SIP based control plane signalling, in particular with the CSCF 210, and on the other hand with the CS telephony domain, e.g., using ISUP based control plane signalling or other types of CS Network-to-Network Interface (NNI) control signalling. The interface between the CSCF 210 and the MGCF 240 is also referred to as Mg. Further details concerning the Mg interface can be found in 3GPP TS 23.002 and TS 23.228. As, illustrated the control plane signalling for a call may be based on SIP based signalling between the remote end 100 and the CSCF 210, SIP based signalling between the CSCF 210 and the MGCF 240, and ISUP based signalling between the MGCF 240 and the MSC 320. The control plane signalling between the UE 10 and the MSC 320 may be based on protocols as for example specified in 3GPP TS 24.008. The control signalling for the call may further involve SIP based control signalling between the CSCF 210 and the TAS 220 as well as between the CSCF 210 and the SCC AS 230. The control plane signalling between the nodes of the IMS infrastructure may be specifically adapted to the needs of the ICS implementation.

Still further, FIG. 2 shows a subscriber database 260. The subscriber database is illustrated to be implemented by a Home Subscriber Server (HSS) and/or Home Location Register (HLR) storing subscriber information both for the 2G/3G radio access technologies and for the LTE radio access technology. For implementing their respective functionalities, the nodes of the IMS infrastructure may communicate with the subscriber database 260, e.g., using the Sh interface, as illustrated for the TAS 220 and for the SCC AS 230. Further details concerning the Sh interface can be found in 3GPP TS 23.002. As further explained below, the subscriber database 260 may also store user specific configuration data for the telephony services implemented by the TAS 220.

Still further, FIG. 2 also show a control node 270 which may responsible for controlling the access of the UE 10 to the telecommunications network, e.g., with respect to mobility between different cells or radio access technologies. In the illustrated example, the control node 270 may be a Mobility Management Entity (MME) and/or a Serving GPRS Support Node (SGSN). Information available from the control node 270 may be stored in the subscriber database 260 and be used by the nodes of the IMS infrastructure for implementing their functionalities. For example, this information may indicate to which telephony supplementary service a user is subscribed, whether the service is active or not, or in some cases also service data, e.g., a number for call forwarding. The T-ADS subsystem 235 may obtain the currently used radio access technology of the UE 10 from the subscriber database 260 and utilize this information when deciding whether to use PS termination or CS termination. The latter termination would for example be selected if the UE 10 is attached via a CS connection to the MSC 320, as illustrated in FIG. 2.

In the illustrated scenario, the call from the remote end 100 will thus be handled by the PS telephony domain and the TAS 220 will execute the corresponding telephony services. Further, the T-ADS subsystem 235 of the SCC AS 230 will decide to terminate the call to the UE 10 using the CS connection via the MSC 320. The MGCF 240 then controls the routing of the call in a corresponding manner so that one or more media components of the call, e.g., voice and optionally also video, are routed via the MSC 320. In the illustrated example this is accomplished via Media Gateway (MGW) 310. As illustrated, the MGW 310 may communicate with the remote end 100 using a packet based interface using the Realtime Transport Protocol (RTP) and referred to as Mb. Further details concerning the Mb interface can be found in 3GPP TS 23.002. Between the MGW 310 and the MSC 320 and between the MSC 320 and the UE 10, the media components are routed via CS connections.

In the illustrated ICS implementation, it is assumed that neither the UE 10 nor the MSC 320 are specifically enhanced to support ICS. Accordingly, the MSC 320 will handle the terminating leg of the call generally in the same way as a conventional CS call. This also means that functionalities corresponding to the telephony services executed by the TAS 220 may be concurrently executed by the MSC 320.

Figure 3:
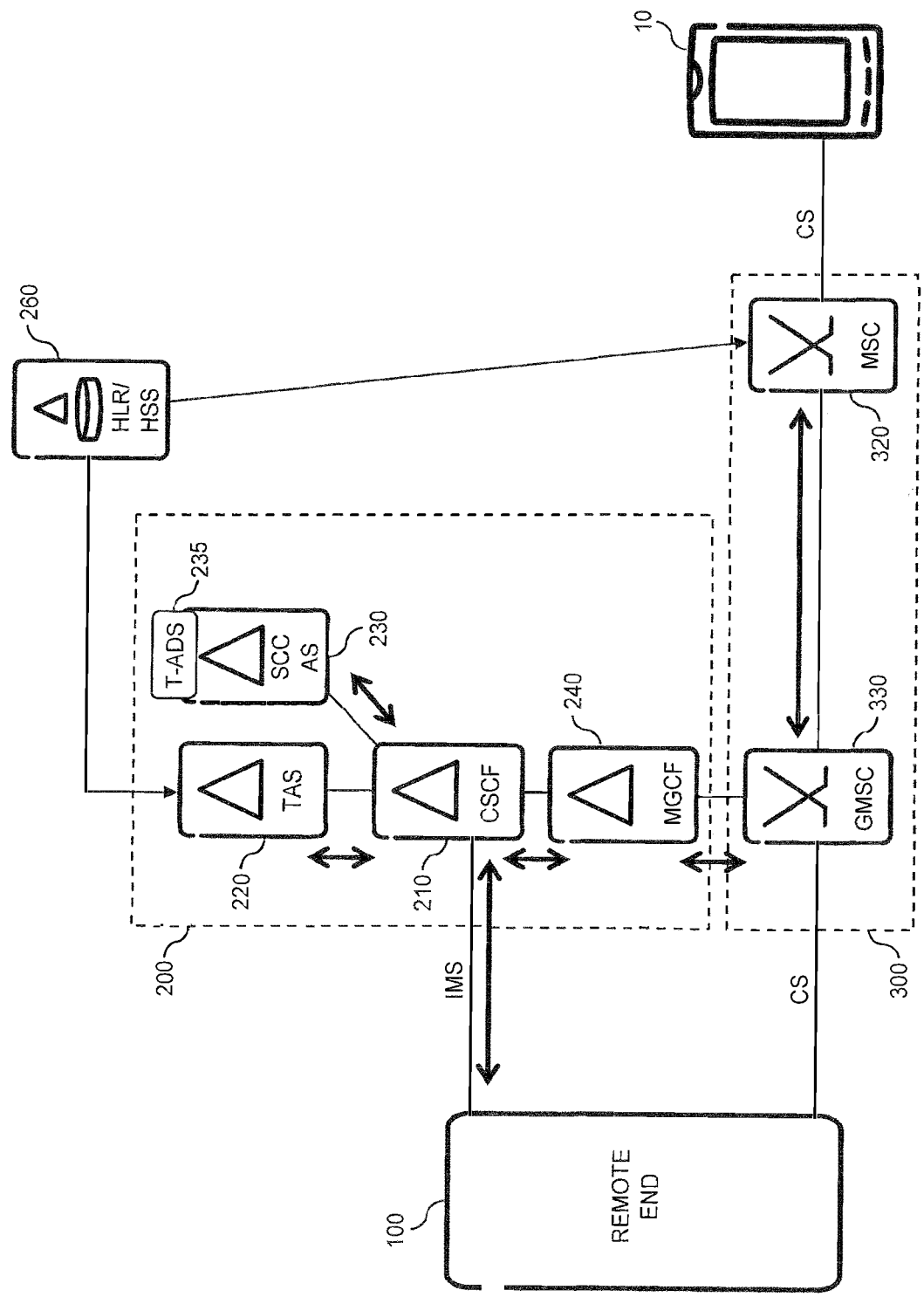
FIG. 3 schematically illustrates an exemplary routing of a call in accordance with an embodiment of the invention.

In some deployment scenarios, a common database may be provided for controlling the call related services as provided by the TAS 220 and the MSC 320. A corresponding scenario is illustrated in FIG. 3, in which the subscriber database 260 provides the same data to the TAS 220 and to the MSC 320. In addition, FIG. 3 also schematically indicates the PS telephony domain 200 and the CS telephony domain 300. As can be seen, the CS telephony domain 300 may include additional nodes, such as a Gateway MSC (GMSC) 330. Similarly, while FIGS. 2 and 3 illustrate nodes of the PS telephony domain 200 which provide certain functionalities of the PTS, it is to be understood that also the PS telephony domain 200 may include further nodes, which are not illustrated in FIGS. 2 and 3 and which may provide further functionalities of the PTS. Implementing the subscriber database 260 as a common database may offer various advantages. For example, the user may configure settings for the services in a comfortable manner, irrespective of being connected via the CS telephony domain or via the PS telephony domain, and also irrespective of the utilized type UE. For example, also in the case of swapping the user's Subscriber Identity Module (SIM) to a UE not supporting IMS or VoLTE, this UE could be used to configure the settings, using conventional CS management mechanisms via the MSC 320. Further, the common database may also be desirable from the perspective of the operator of the telecommunications network, e.g., in view of implementation and management efficiency.

In order to avoid problems arising from the concurrent execution of services in the PS telephony domain 200 and in the CS telephony domain 300, the concepts as described in the following use an indication to the MGCF 240 to make the MGCF 240 aware that services related to a call which is routed to the CS telephony domain 300 are controlled in the PS telephony domain 200. In the scenarios of FIGS. 2 and 3, this may in particular correspond to an indication that ICS mechanisms are used for this call and therefore all services related to the call are implemented and executed in the TAS 220. The MGCF 240 may then adapt the control signalling to the nodes of the CS telephony domain 300 accordingly, thereby avoiding conflicts due to the concurrent execution of the services. For example, certain parameters in the ISUP messages to the MSC 320 may be set to prevent conflicting execution of a given service. In the following, this will be further explained by referring to an exemplary scenario in which the user configured a CFNR service, and the CFNR service is executed both by the TAS 220 and by the MSC 320.

With respect to the CFNR service, the MGCF 240 may prevent the conflicting service execution by setting a parameter referred to as ISUP Redirection Counter to a maximum allowed value, which is five. The MGCF 240 may use a ISUP IAM message to send the set value of the ISUP Redirection Counter to the MSC 320. In accordance with the conventional behavior of the MSC 320 with respect to the ISUP Redirection Counter, the MSC 320 will then refrain from performing any further forwarding or redirection with respect to this call. Consequently, no new functionalities need to be provided in the MSC 320.

The indication to the MGCF 240 may be implemented in different ways. For example, the SCC AS 230 could provide the indication in response to deciding to use CS termination for the call and include the indication in an SIP message toward the MGCF 240, e.g., in the form of an additional information element, message parameter, bit field, or flag. The indication may also be provided by adding a certain prefix to a CS domain routing number (CSRN) which is resolved by the SCC AS 230 and sent to the MGCF 240 for routing the call to the desired CS destination endpoint.

Figure 4A:
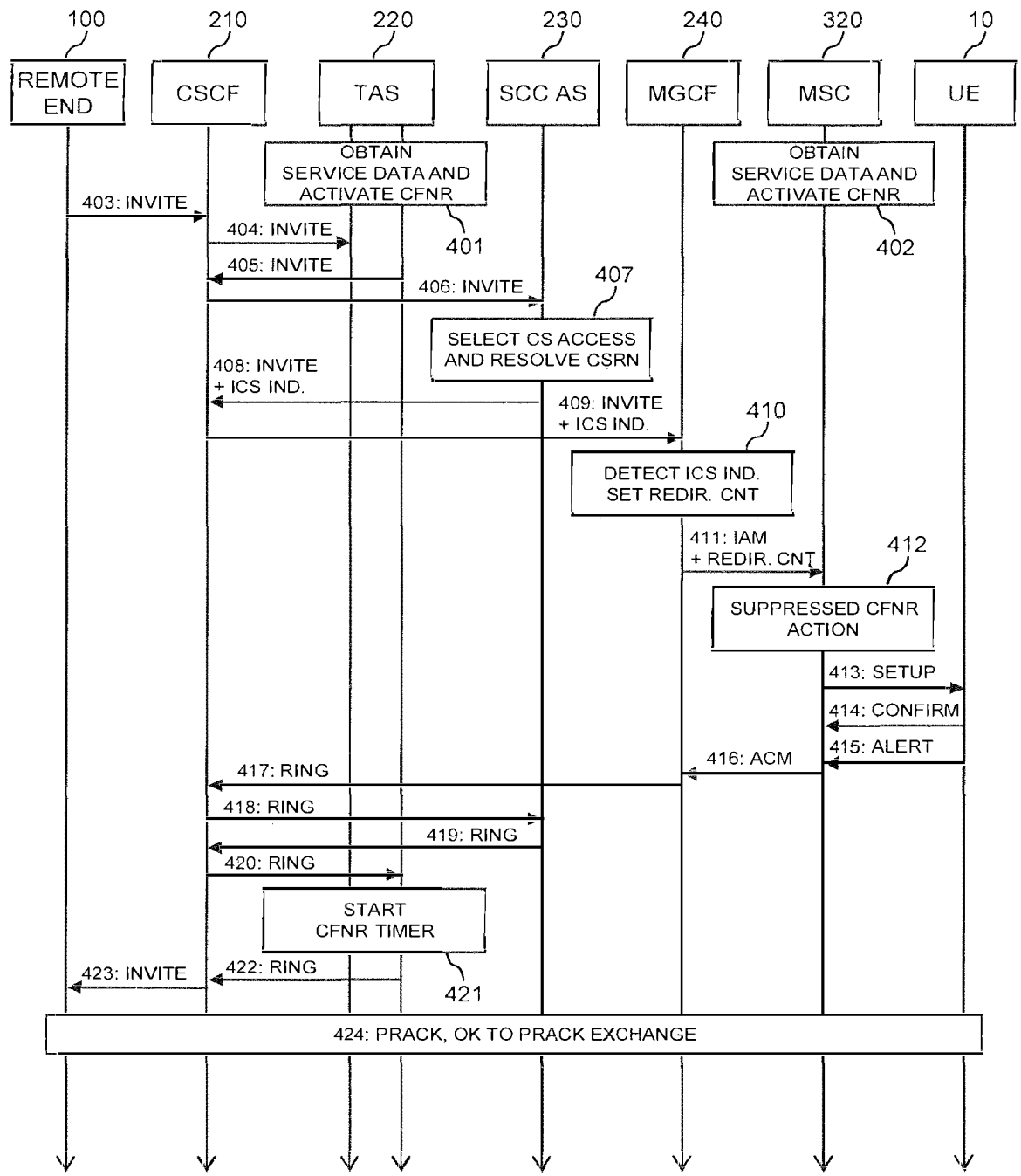
FIGS. 4*a* and 4*b* show a signalling diagram for illustrating a call handling procedure in accordance with an embodiment of the invention.
Figure 4B:
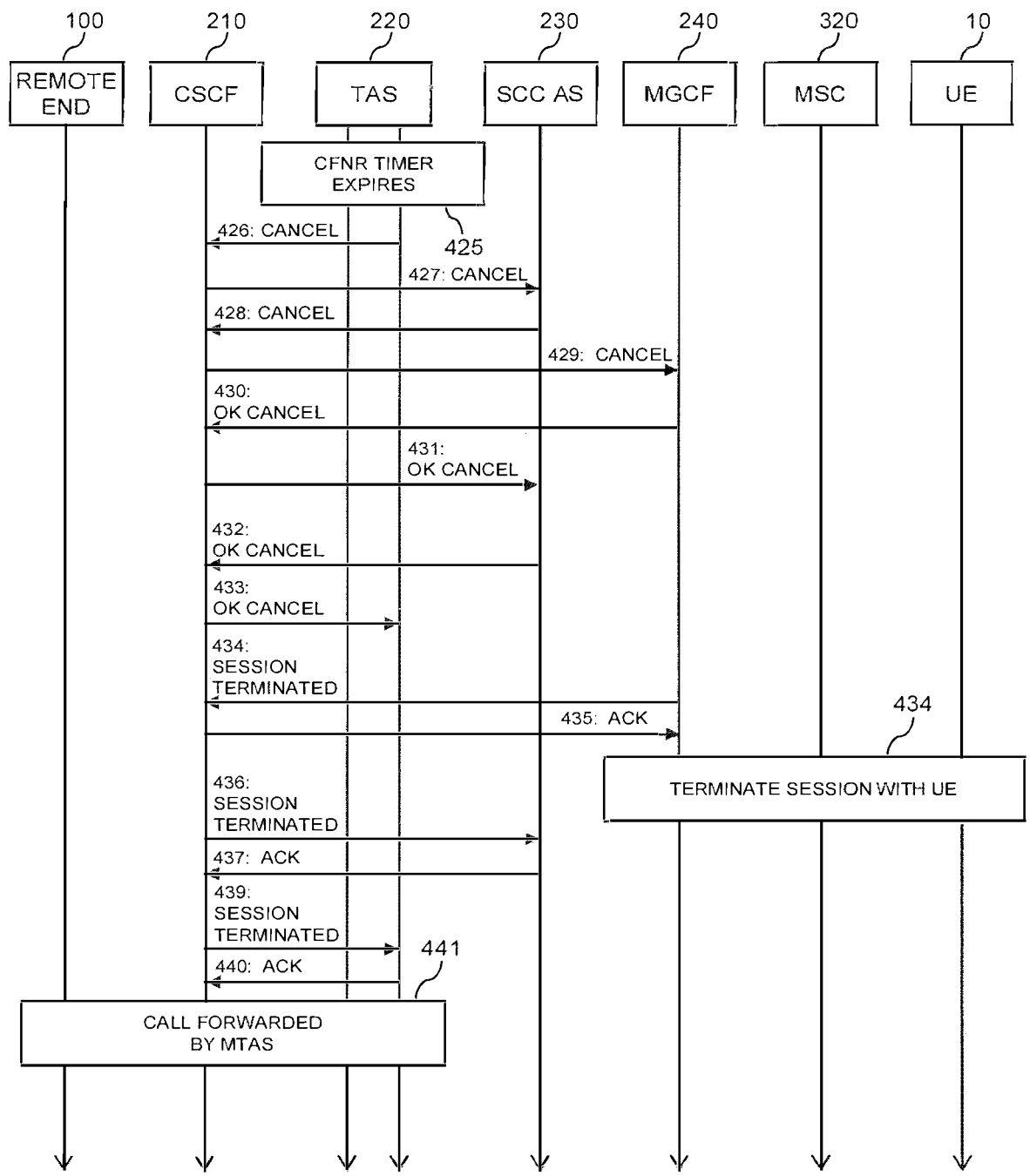

A detailed process involving handling of a CFNR service in accordance with the above concepts will now be further explained by referring to the exemplary signalling diagram of FIGS. 4a and 4b. The processes of FIGS. 4a and 4b involve the remote end 100, the CSCF 210, the TAS 220, the SCC AS 230, the MGCF 240, the MSC 320, and the UE 10. It is assumed that ICS is implemented in the above-described manner and that the user of the UE 10 is registered for ICS. Accordingly, telephony services for the user will controlled by the TAS 220. Such telephony services may in particular include supplementary services as defined for IMS Multimedia Telephony. In the example of FIGS. 4a and 4b specifically the CFNR service will be considered.

Still further, it is assumed that the UE 10 is attached to the telecommunications network using a CS connection to the MSC 320, and that the presently used access does not support IMS telephony services or the user is not registered in the IMS. Moreover, it is assumed that the user has configured the CFNR service and that the corresponding settings are available both to the MSC 320 and to the TAS 220, e.g., from the subscriber database 260 acting as common database.

As illustrated by step 401, the TAS 220 may thus obtain service data from the subscriber database 260 and activate CFNR service in accordance with the obtained service data. Similarly, as illustrated by step 402, the MSC 320 may obtain the service data from the subscriber database 260 and activate CFNR service in accordance with the obtained service data. For this purpose, the service data may be retrieved from the HLR functionality of the subscriber database 260 and stored in a Visitor Location Register (VLR) associated with the MSC 320. In this situation, the MSC 320 and the TAS 220 will execute the CFNR service using the same service settings as indicated by the service data.

Next, as indicated by message 403, the CSCF 210 receives an SIP INVITE message for the user from the remote end 100. On the basis of initial filter criteria (iFC), the CSCF 210 sends the SIP INVITE message to the TAS 220 which handles the telephony services for the user, as indicated by message 404. Then, as indicated by message 405, the TAS 220 returns the SIP INVITE message to the CSCF 210. Again using iFC, the CSCF 210 then forwards the SIP INVITE message to the SCC AS 230, as indicated by message 406.

The T-ADS subsystem 235 of the SCC AS 230 may then detect that the user is not attached via a PS access supporting IMS telephony services, but attached via a CS access. The T-ADS subsystem 235 will thus select CS termination of the call and resolve the CSRN for the user from the subscriber database 260, as indicated by step 407. Then, as illustrated by message 408, the SCC AS 230 sends an outgoing SIP Invite message including the CSRN to the CSCF 210. In accordance with the illustrated concepts, the SCC AS 230 also supplements this SIP Invite message with an ICS indication. The ICS indication indicates that services related to the call are handled according to ICS in the PS telephony domain. As shown by message 409, the CSCF 210 forwards the SIP Invite message with the CSRN and ICS indication to the MGCF 240. This forwarding may be accomplished via a Breakout Gateway Control Function (BGCF).

Next, the MGCF 240 controls routing of the call to the CS telephony domain. For this purpose, the MGCF 240 may generate ISUP control signalling on the basis of the of the information in the received SIP Invite message, i.e., translate between SIP based and ISUP based control signalling. Further, as illustrated by step 410, the MGCF 240 detects the ICS indication in the received SIP Invite message and adapts the ISUP control signalling accordingly. In the illustrated example, this is accomplished by sending an ISUP IAM message to the MSC 320, as indicated by message 411. In this message, the MGCF 240 sets the ISUP Redirection Counter is set to its maximum allowed value of five. In response to detecting the ICS indicator, the MGCF 240 may also act on other ISUP parameters. Due to the adapted ISUP control signalling the MGCF 240 may cause the MSC 320 or other CS nodes to operate differently from the case of a call subjected to normal CS breakout, without ICS being used. In response to detecting the ICS indication, the MGCF 240 may also handle the through connect of media transport in the MGW (e.g., as illustrated in FIG. 2) in a different manner than in the case of a call subjected to normal CS breakout. For example, if the ICS indication is present, the MGCF 240 may decide to not through connect media transport unless the call is answered.

Upon receiving the ISUP IAM message 411 from the MGCF 240, the MSC 320 modifies its usual activity with respect to the CFNR service, as indicated by step 412. In particular, the MSC 320 will not perform any forwarding or redirection of the call, irrespective of expiry of a CFNR timer, because it assumes that the maximum allowable number of redirections was already reached.

Otherwise, the MSC 320 may handle the call in a conventional manner. In particular, as illustrated by messages 413 to 416, the MSC 320 may offer the call to the UE 10, causing the UE 10 to alert the user, to confirm the call, and to inform the MSC 320 that the user is alerted, which is further indicated by the MSC 320 to the MGCF 240 by an ISUP Address Complete Message (ACM).

The MGCF 240 maps the received ISUP ACM to an SIP 180 Ringing message which is then sent to the CSCF 210, and forwarded via the SCC AS 230 to the TAS 220, as indicated by messages 417 to 420. In response to receiving the SIP 180 Ringing message, the TAS 220 starts a CFNR timer, as indicated by step 421. Further, the TAS 220 forwards the SIP 180 Ringing message via the CSCF 210 towards the remote end 100, as indicated by messages 422 and 423. Next, as indicated by step 424, SIP Provisional Response Acknowledgement (PRACK) messages and SIP 200 OK to the SIP PRACK messages are exchanged, thereby finishing the initial phase of the call setup.

Continuing in FIG. 4b, it is then assumed that the CFNR timer started at step 424 expires without the call being answered at the UE 10, as indicated by step 425. In this case, as illustrated by messages 426 to 429, the TAS 220 issues an SIP CANCEL message toward the MGCF 240, which is forwarded via the CSCF 210 and the SCC AS 230. The MGCF 240 acknowledges this SIP CANCEL message by an SIP 200 OK message, which is returned via the SCC AS 230 and the CSCF 210 to the TAS 220, as indicated by messages 430 to 433.

The MGCF 240 proceeds by initiating termination of the session with the UE 10, as indicated by step 434. The MGCF 240 indicates termination of the session by means of an SIP 487 Session Terminated message, which is forwarded via the SCC AS 230 and the CSCF 210 to the TAS 220, as indicated by messages 435 to 440.

As indicated by step 441, the MTAS 220 may then proceed with forwarding the call to another destination, as configured in the service data, without conflicting forwarding operations by the MSC 320.

Figure 5:
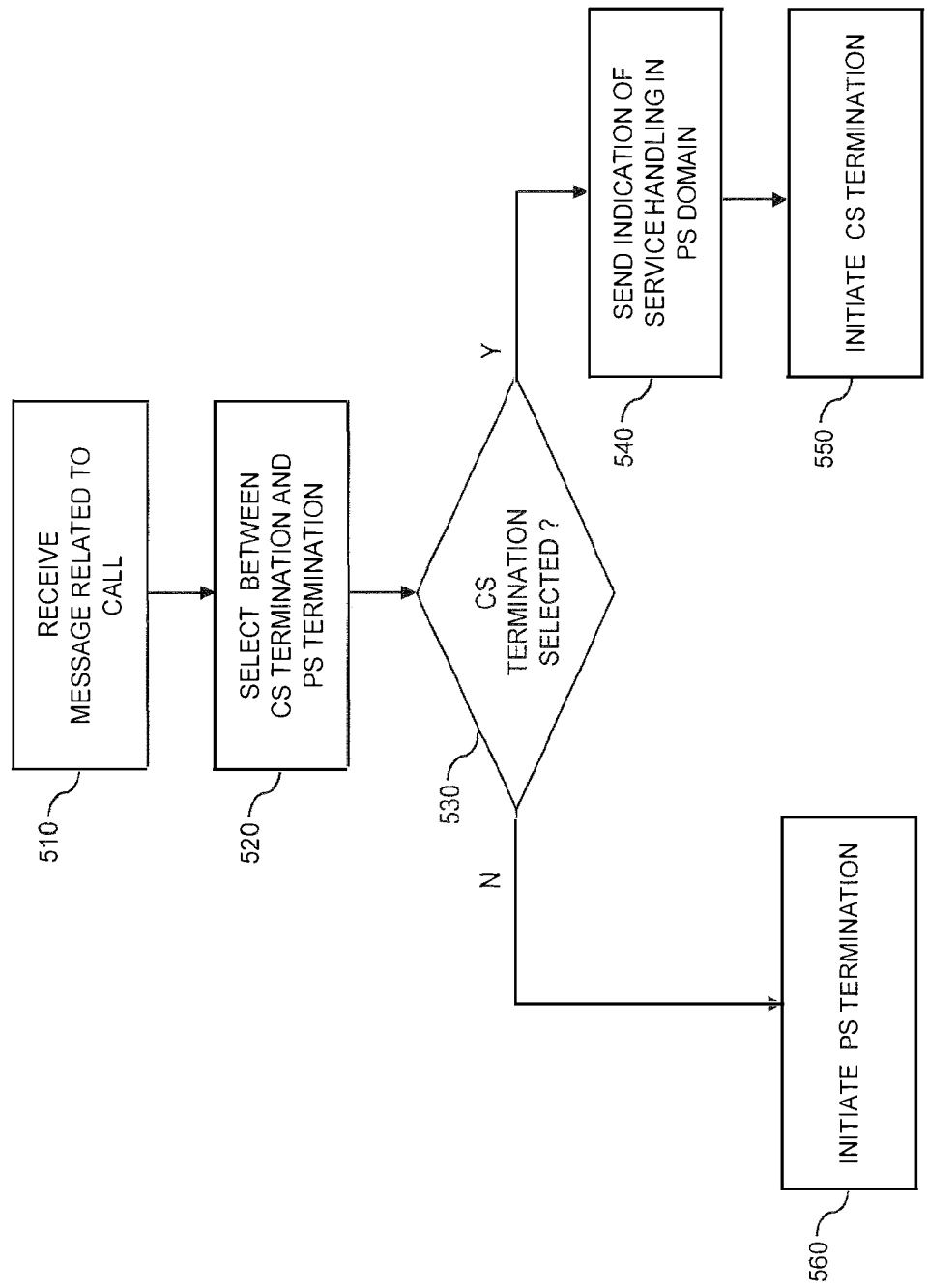
FIG. 5 shows a flowchart for illustrating a method according to an embodiment of the invention.

FIG. 5 shows a flowchart for illustrating a method of call handling in a telecommunications network having a PS telephony domain for handling packet based calls and a CS telephony domain for handling CS calls, e.g., in a telecommunications network as explained above. The method may specifically be implemented in a node of the PS telephony domain which performs selection between PS termination and CS termination of a call, e.g., in the above-mentioned SCC AS 230.

At step 510, the node may receive a message related to a call. The message may for example have the purpose of setting up the call to a user attached to the telecommunications network through a UE. The message may for example be an SIP message, in particular an SIP Invite message. For example, the message may correspond to message 406 of FIG. 4a.

At step 520, the node selects between PS termination of the call and CS termination of the call. In other words, the node decides whether to terminate the call using a PS connection to the UE of the user or to terminate the call using a PS connection to the UE of the user. This selection may for example be accomplished on the basis of data from a subscriber database, e.g., the database 260. For example, the selection could take into account the access type and/or capabilities to which the user's UE is currently attached and/or whether the user is currently registered in IMS.

At step 530, it is checked whether CS termination was selected at step 520. If this is the case, as indicated by branch "Y", the method proceeds with step 540.

At step 540, the node sends an indication to a further node which controls routing of calls between the PS telephony domain and the CS telephony domain. This further node may for example correspond to the above-mentioned MGCF 240. The indication may be included in an SIP message to the further node, thereby allowing for efficient utilization of existing signalling mechanisms between the node and the further node. The message may for example be an SIP message, in particular an SIP Invite message. The message may for example correspond to message 408 of FIG. 4a.

In some scenarios, the indication may be provided as a prefix of a routing number. The routing number may for example be resolved by the node and provided to the further node for allowing the further node to control routing of the call to a given CS destination. In other scenarios, other types of information elements may be used for implementing the indication, e.g., a flag or bit field in the message, a message parameter, or the like.

The indication indicates that services related to the call are controlled in the PS telephony domain. In particular, the indication may indicate that the call is handled in accordance with ICS mechanisms. The services may for example include a call forwarding service. The call forwarding service may specifically provide forwarding of the call to another destination in response to the call not being answered at the UE.

At step 550, the node may initiate CS termination of the call. This may for example involve performing control signalling to the further node to initiate routing of the call to the CS telephony domain. This may also involve sending the routing number resolved at step 540 to the further node. Accordingly, steps 540 and 550 may also be combined, e.g., by sending the indication in the same message as used for initiating the CS termination of the call.

On the basis of the indication provided at step 540, the further node may adjust its operation to take into account that the services related to the call are handled in the PS telephony domain. This may in particular involve adaptation of control signalling with respect to one or more CS nodes, e.g., the ISUP control signalling as performed toward the MSC 320. In this way conflicting execution of one or more services in the CS telephony domain may be avoided.

If the check of step 530 reveals that CS termination was not selected, i.e., PS termination selected, the method continues with step 560, as indicated by branch "N".

At step 560, the node may initiate PS termination of the call. This may for example involve performing control signalling to other nodes in the PS telephony domain.

In some scenarios, a common database may be provided for controlling said services related to the call in the PS telephony domain and for controlling said services related to the call in the CS telephony domain.

Figure 6:
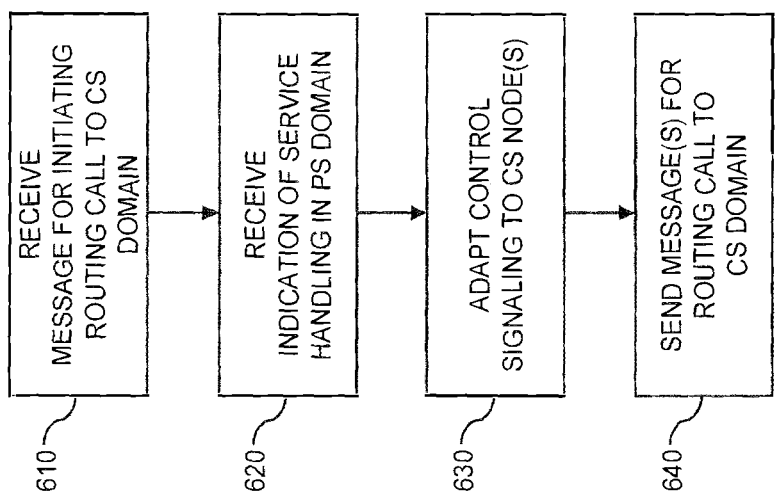
FIG. 6 shows a flowchart for illustrating a further method according to an embodiment of the invention.

FIG. 6 shows a flowchart for illustrating further method of call handling in a telecommunications network having a PS telephony domain for handling packet based calls and a CS telephony domain for handling CS calls, e.g., a telecommunications network as explained above. The method may specifically be implemented in a node controlling routing of calls between the PS telephony domain and the CS telephony domain, e.g., in the above-mentioned MGCF 240.

At step 610, the node may receive a message for initiating routing of a call from the PS telephony domain to the CS telephony domain. The message may for example be an SIP message, in particular an SIP Invite message. The message may indicate a routing number for routing the call to a desired CS destination. The message may for example correspond to message 408 of FIG. 4a. The message may for example be received in response to a decision in the PS telephony domain to terminate the call using a CS connection to a UE, i.e., to use CS termination for the call.

At step 620, the node receives an indication from a node of the PS telephony domain. The indication indicates that services related to the call are controlled in the PS telephony domain. In particular, the indication may indicate that the call is handled in accordance with ICS mechanisms. The services may for example include a call forwarding service. The call forwarding service may specifically provide forwarding of the call to another destination in response to the call not being answered at the UE.

The indication of step 620 may be included in an SIP message, e.g., from a node of the PS telephony domain which performs the selection between PS termination and CS termination, thereby allowing for efficient utilization of existing signalling mechanisms between the node and the further node. The message may for example be an SIP message, in particular an SIP Invite message. The message may for example correspond to message 408 of FIG. 4a. Accordingly, steps 610 and 620 may also be combined, e.g., by receiving the indication in the same message as received at step 610.

In some scenarios, the indication may be provided as a prefix to a routing number. The routing number may for example be resolved by the node selecting between PS and CS termination and included into the message received at step 610. In other scenarios, other types of information elements may be used for implementing the indication, e.g., a flag or bit field in the message, a message parameter, or the like.

At step 630, the node adapts control signalling to at least one node of the CS telephony domain. The at least one node of the CS telephony domain may for example be a switching node, such as the MSC 320. The node of the CS telephony domain could also be a media gateway node such as the MGW 310. In the latter case, the control signalling could selectively through connect media transport through the media gateway node. The adaptation is performed in accordance with the indication received at step 620. This control signalling may for example be ISUP control signalling, e.g., in the form of one or more ISUP IAM messages. For example, the adapted control signalling may correspond to message 411 of FIG. 4a. If the services related to the call comprise a call forwarding service, the control signalling may be adapted to indicate that the number of redirections of the call has reached a maximum allowed number.

At step 640 the node may perform the adapted control signalling, e.g., by sending one or more control messages to one or more nodes of the CS telephony domain, e.g., to the MSC 320, thereby performing routing of the call to the CS telephony domain.

As can be seen, by operating in accordance with the method of FIG. 6, the node may perform routing of the call to the CS telephony domain in response to a decision in the PS telephony domain to use CS termination for the call. In accordance with the received indication that services related to the call are controller in the PS telephony domain, the node adapts its control signalling to one or more nodes of the CS telephony domain.

In some scenarios, a common database may be provided for controlling said services related to the call in the PS telephony domain and for controlling said services related to the call in the CS telephony domain.

It is to be understood that the methods of FIGS. 5 and 6 may be combined with each other in a system including the node performing selection between PS and CS termination and the node controlling the routing of a call from the PS telephony domain to the CS telephony domain in response to selecting CS termination. In this case the indication provided in step 540 of FIG. 5 may correspond to the indication received at step 620 of FIG. 6. That is to say, the node in the method of FIG. 6 may correspond to the further node in the method of FIG. 5.

Figure 7:
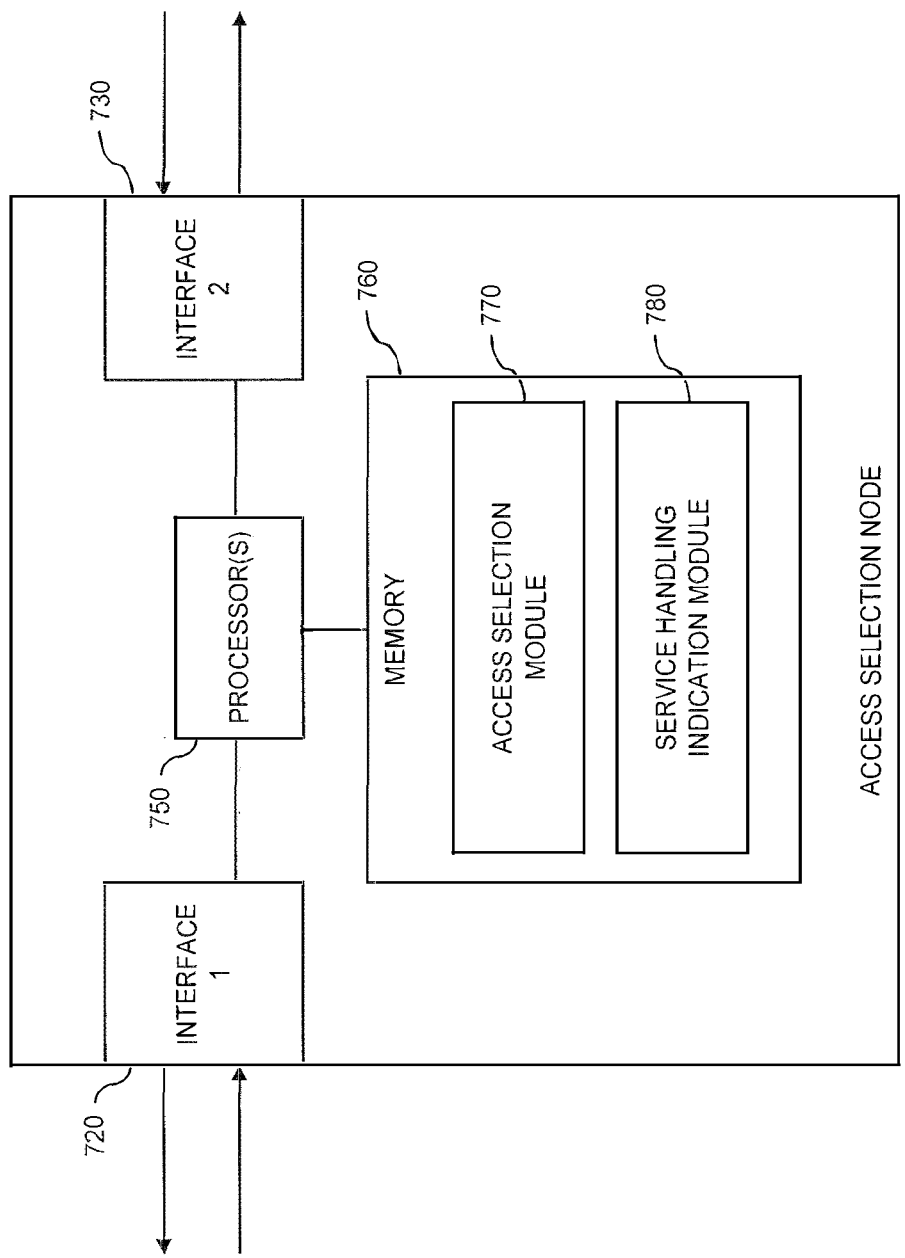
FIG. 7 schematically illustrates a node according to an embodiment of the invention.

FIG. 7 illustrates exemplary structures which may be used for implementing the above concepts in a node of the PS telephony domain which performs selection between PS termination and CS termination of a call, e.g., in the above-mentioned SCC AS 230. In FIG. 7, the node is illustrated as being implemented as a single device. However, it is to be understood that the node could also be implemented by multiple devices, e.g., a server cloud or the like.

As illustrated, the node includes a first interface 720. The first interface 720 may for example be configured for communication with other nodes of the PS telephony domain, e.g., with the above-mentioned CSCF 210. The first interface may for example be an SIP based interface. Further, the node may also be provided with a second interface 730. The second interface may for example be configured for communication with a subscriber database, e.g., the above-mentioned subscriber database 260. The second interface 730 may for example correspond to the above-mentioned Sh interface.

Further, the node includes one or more processors 750 coupled to the interfaces 720, 730, and a memory 760 coupled to the processor(s) 750. The memory 760 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 760 includes suitably configured program code to be executed by the processor(s) 750 so as to implement the above-described functionalities of the node. In particular, the memory 760 may include an access selection module 770 so as to implement the above-described functionalities of selecting between PS termination and CS termination. For example, the access selection module 770 may be used for implementing the above-mentioned T-ADS subsystem 235 or functionalities thereof. Further, the memory 760 may also include a service handling indication module 780 for implementing the above-mentioned functionalities of providing the indication that services related to a call are controlled in the PS telephony domain.

It is to be understood that the structures as illustrated in FIG. 7 are merely schematic and that the node may actually include further components which, for the sake of clarity, have not been illustrated, e.g., further interfaces. Also, it is to be understood that the memory 760 may include further types of program code modules, which have not been illustrated, e.g., program code modules for implementing known functionalities of an SCC AS. According to some embodiments, also a computer program product may be provided for implementing functionalities of the node, e.g., in the form of a medium storing the program code and/or other data to be stored in the memory 760.

Figure 8:
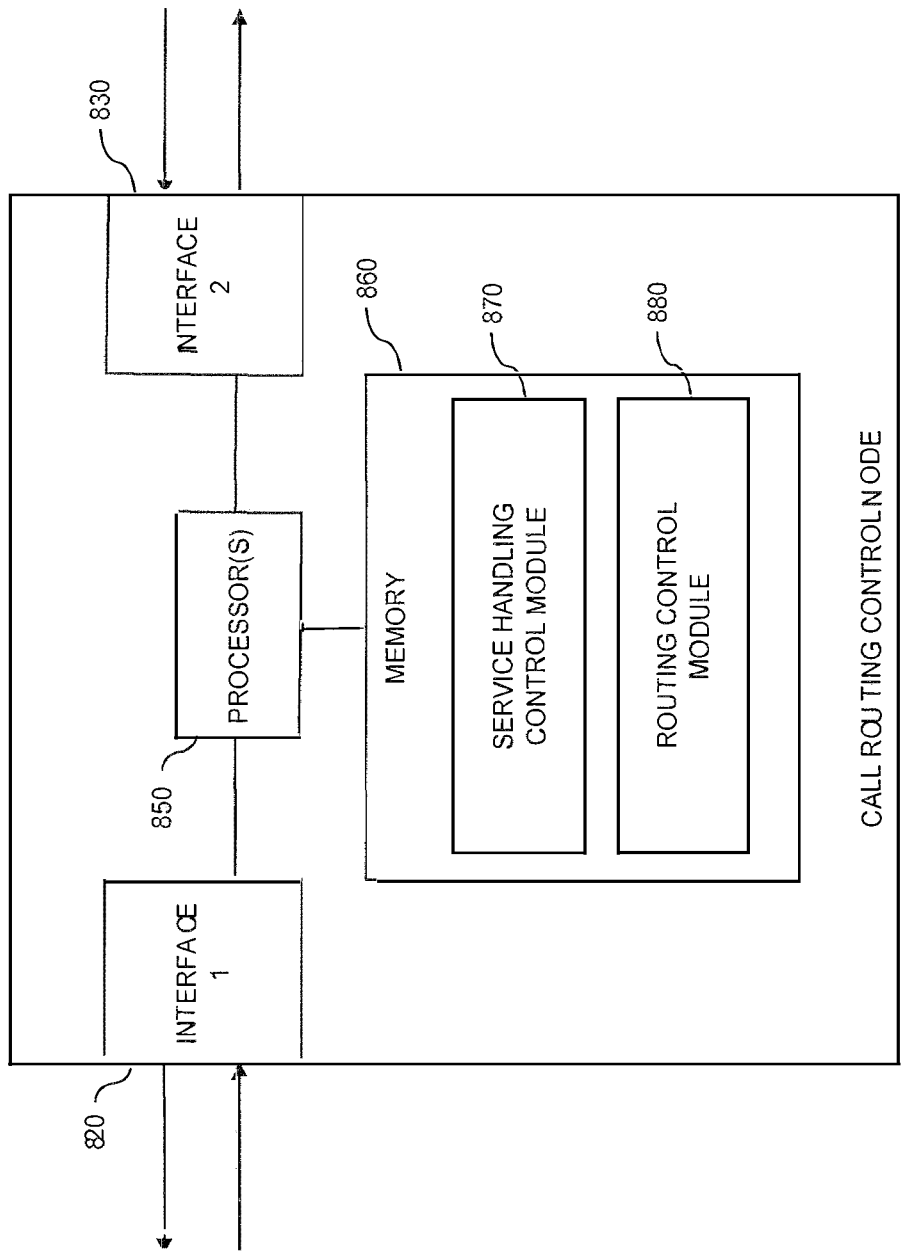
FIG. 8 schematically illustrates a further node according to an embodiment of the invention.

FIG. 8 illustrates exemplary structures which may be used for implementing the above concepts in a node which controls routing of calls between the PS telephony domain and CS telephony domain, e.g., in the above-mentioned MGCF 240. The node may be a node of the PS telephony domain. In FIG. 8, the node is illustrated as being implemented as a single device. However, it is to be understood that the node could also be implemented by multiple devices, e.g., a server cloud or the like.

As illustrated, the node includes a first interface 820. The first interface 820 may for example be configured for communication with of the PS telephony domain, e.g., with the above-mentioned CSCF 210. The first interface 820 may for example be an SIP based interface. Further, the node includes a second interface 830. The second interface may for example be configured for communication with one or more nodes of the CS telephony domain, e.g., the above-mentioned MSC 320. The second interface 830 may for example be an ISUP based interface and correspond to the above-mentioned Mg interface.

Further, the node includes one or more processors 850 coupled to the interfaces 820, 830, and a memory 860 coupled to the processor(s) 850. The memory 860 may include a ROM, e.g., a flash ROM, a RAM, e.g., a DRAM or SRAM, a mass storage, e.g., a hard disk or solid state disk, or the like. The memory 860 includes suitably configured program code to be executed by the processor(s) 850 so as to implement the above-described functionalities of the node. In particular, the memory 860 may include a service handling control module 870 so as to implement the above-described functionalities of adapting control signalling depending on the indication that services related to a call are controlled in the PS telephony domain. Further, the memory 860 may also include a routing control module 880 for implementing the above-described functionalities of routing calls between the PS telephony domain and CS telephony domain, e.g., by translating SIP based control signalling to ISUP based control signalling and/or vice versa.

It is to be understood that the structures as illustrated in FIG. 8 are merely schematic and that the node may actually include further components which, for the sake of clarity, have not been illustrated, e.g., further interfaces. Also, it is to be understood that the memory 860 may include further types of program code modules, which have not been illustrated, e.g., program code modules for implementing known functionalities of a MGCF. According to some embodiments, also a computer program product may be provided for implementing functionalities of the node, e.g., in the form of a medium storing the program code and/or other data to be stored in the memory 860.

As can be seen, the concepts as described above may be efficiently used for resolving conflicts due to concurrent execution of call related services in the PS telephony domain and in the CS telephony domain. In particular, the concepts may be applied without requiring specific modifications as compared to existing UEs, MSCs, or other nodes of the CS telephony domain, thereby facilitating implementation. Also other issues arising from execution of call related services in the PS telephony domain may be addressed.

It is to be understood that the examples and embodiments as explained above are merely illustrative and susceptible to various modifications. For example, the concepts as described herein could be used in connection with various types of radio access technology and network topology, without limitation to the illustrated examples of LTE and 2G/3G network infrastructure. Also, it should be noted that the concepts may be applied irrespective of the call being originated (at the remote end) as a packet based call or as a CS call. Still further, the concepts may be applied in connection with various services, among which the above-mentioned CFNR service is only an example. Moreover, it is to be understood that the above concepts may be implemented by using correspondingly designed software to be executed by one or more processors of an existing device, or by using dedicated device hardware. Still further, it is to be understood that the above-mentioned nodes may each be implemented by a single device or by multiple devices, e.g., by a device cloud or the like.

The invention claimed is:

1. A method of call handling in a telecommunications network having a packet switched telephony domain for handling packet based calls and a circuit switched telephony domain for handling circuit switched calls, the method comprising:
    deciding, by a first node of the packet switched telephony domain, whether to terminate a call to a user equipment using a packet switched connection to the user equipment or to terminate the call to the user equipment using a circuit switched connection to the user equipment; and
    in response to deciding to terminate the call using the circuit switched connection, sending, by the first node to a third node controlling routing of calls between the packet switched telephony domain and the circuit switched telephony domain, an invite message including a routing number and an indication that telephony services related to the call are controlled in the packet switched telephony domain,
    wherein the indication is provided as a prefix of the routing number.

2. The method according to claim 1, wherein the invite message is a Session Initiation Protocol Invite message, and wherein the indication is an IP Multimedia Subsystem ("IMS") Centralized Services ("ICS") indication.

3. The method according to claim 1, further comprising:
in response to deciding to terminate the call using the circuit switched connection, resolving, by the first node, the routing number using a subscriber database at a second node of the packet switched telephony domain and/or the circuit switched telephony domain,
wherein the subscriber database is a common database provided to control the telephony services related to the call in the packet switched telephony domain and to control the telephony services related to the call in the circuit switched telephony domain.

4. The method according to claim 1, wherein the telephony services related to the call comprise a call forwarding service.

5. The method according to claim 4, wherein the call forwarding service provides forwarding of the call to another destination in response to the call not being answered at the user equipment.

6. The method according to claim 1, wherein the invite message comprises the routing number and an explicit indication that telephony services related to the call are controlled in the packet switched telephony domain.

7. The method according to claim 6, wherein the explicit indication comprises at least one of: an additional information element, a message parameter, a bit field, and a flag.

8. A method of call handling in a telecommunications network having a packet switched telephony domain for handling packet based calls and a circuit switched telephony domain for handling circuit switched calls, the method comprising:
in response to a decision in the packet switched telephony domain to terminate a call to a user equipment using a circuit switched connection to the user equipment, controlling, by a node of the packet switched telephony domain, routing of the call from the packet switched telephony domain to the circuit switched telephony domain;
receiving, by the node of the packet switched telephony domain, an invite message including a routing number and an indication that telephony services related to the call are controlled in the packet switched telephony domain; and
adapting, by the node of the packet switched telephony domain, its control signaling to at least one node of the circuit switched telephony domain in accordance with the received indication,
wherein the indication is provided as a prefix of the routing number.

9. The method according to claim 8, wherein the telephony services related to the call comprise a call forwarding service.

10. The method according to claim 9, wherein the adapted control signaling indicates that the number of redirections of the call has reached a maximum allowed number.

11. The method according to claim 9, wherein the call forwarding service provides redirection of the call to another destination in response to the call not being answered at the user equipment.

12. The method according to claim 8, wherein the invite message is a Session Initiation Protocol Invite message, and wherein the indication is an IP Multimedia Subsystem ("IMS") Centralized Services ("ICS") indication.

13. The method according to claim 8, wherein the routing number is resolved from a subscriber database that is a common database provided to control the telephony services related to the call in the packet switched telephony domain and to control the telephony services related to the call in the circuit switched telephony domain.

14. The method according to claim 8, wherein the control signaling comprises Integrated Services Digital Network User Part control signaling.

15. A first node for a telecommunications network having a packet switched telephony domain for handling packet based calls and a circuit switched telephony domain for handling circuit switched calls, the first node comprising:
an interface; and
at least one processor, the at least one processor being configured to:
decide whether to terminate a call to a user equipment using a packet switched connection to the user equipment or to terminate the call to the user equipment using a circuit switched connection to the user equipment; and
send, via the at least one interface to a third node controlling routing of calls between the packet switched telephony domain and the circuit switched telephony domain, an invite message including the routing number and an indication that telephony services related to the call are controlled in the packet switched telephony domain, wherein the invite message is sent in response to deciding to terminate the call using the circuit switched connection,
wherein the indication is provided as a prefix of the routing number.

16. The node according to claim 15, wherein the invite message is a Session Initiation Protocol Invite message, and wherein the indication is an IP Multimedia Subsystem ("IMS") Centralized Services ("ICS") indication.

17. The node according to claim 15, further comprising:
resolve a routing number using a subscriber database at a second node of the packet switched and/or circuit switched telephony domain in response to deciding to terminate the call using the circuit switched connection,
wherein the subscriber database is a common database is provided for controlling the telephony services related to the call in the packet switched telephony domain and for controlling the telephony services related to the call in the circuit switched telephony domain.

18. The node according to claim 15, wherein the telephony services related to the call comprise a call forwarding service.

19. The node according to claim 18, wherein the call forwarding service provides forwarding of the call to another destination in response to the call not being answered at the user equipment.

20. A first node for a telecommunications network having the packet switched telephony domain for handling packet based calls and a circuit switched telephony domain for handling circuit switched calls, the first node comprising:
a first interface to a second node that is included in the packet switched telephony domain;
a second interface to a third node that is included in the circuit switched telephony domain; and
at least one processor, the at least one processor being configured to:
in response to a decision in the packet switched telephony domain to terminate a call to a user equipment using a circuit switched connection to the user equipment, control routing of the call from the packet switched telephony domain to the circuit switched telephony domain;

receive, via the first interface, an invite message including a routing number and an indication that telephony services related to the call are controlled in the packet switched telephony domain; and adapt control signaling via the second interface in accordance with the received indication, wherein the indication is provided as a prefix of the routing number.

21. The node according to claim 20, wherein the telephony services related to the call comprise a call forwarding service.

22. The node according to claim 21, wherein the adapted control signaling indicates that the number of redirections of the call has reached a maximum allowed number.

23. The node according to claim 21, wherein the call forwarding service provides redirection of the call to another destination in response to the call not being answered at the user equipment.

24. The node according to claim 20, wherein the invite message is a Session Initiation Protocol Invite message, and wherein the indication is an IP Multimedia Subsystem ("IMS") Centralized Services ("ICS") indication.

25. The node according to claim 20, wherein the control signaling comprises Integrated Services Digital Network User Part control signaling.

26. The node according to claim 20, wherein the routing number is resolved from a subscriber database that is a common database provided to control the telephony services related to the call in the packet switched telephony domain and to control the telephony services related to the call in the circuit switched telephony domain.

* * * * *

UNITED STATES PATENT AND TRADEMARK OFFICE
CERTIFICATE OF CORRECTION

PATENT NO.       : 10,749,911 B2
APPLICATION NO.  : 15/941049
DATED            : August 18, 2020
INVENTOR(S)      : Hallenstal et al.

Page 1 of 1

It is certified that error appears in the above-identified patent and that said Letters Patent is hereby corrected as shown below:

In the Specification

Column 1, Line 10, delete "2015," and insert -- 2015, now Pat. No. 10,044,768, --, therefor.

Column 4, Line 45, delete "shows exemplary" and insert -- shows an exemplary --, therefor.

Column 5, Line 61, delete "responsible of" and insert -- responsible for --, therefor.

Signed and Sealed this
Twenty-ninth Day of December, 2020

Andrei Iancu
*Director of the United States Patent and Trademark Office*